(No Model.)
C. SMITH.
Grain Separator.
No. 236,269. Patented Jan. 4, 1881.
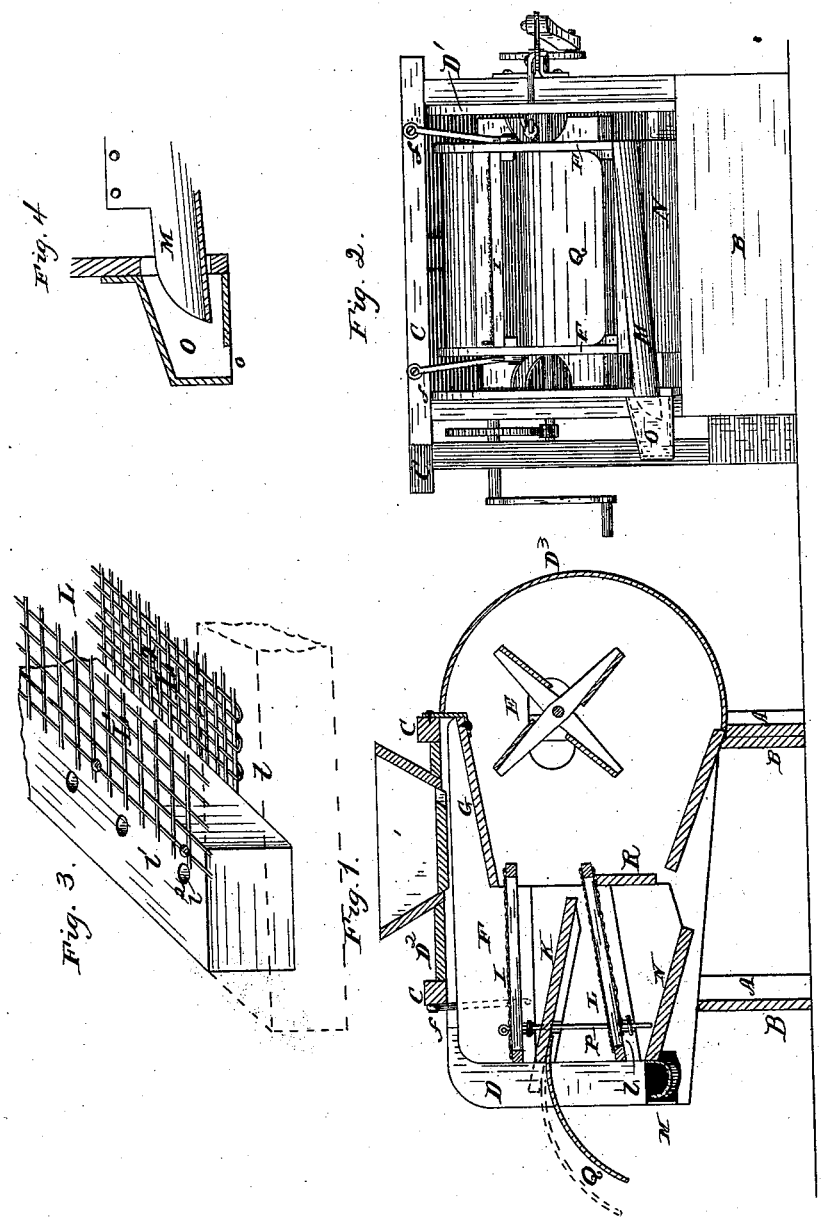
Witnesses:
H. N. Low
J. S. Barker.
Inventor:
Cyrus Smith
by Doubleday and Bliss
attys

UNITED STATES PATENT OFFICE.

CYRUS SMITH, OF CANTON, OHIO.

GRAIN-SEPARATOR.

SPECIFICATION forming part of Letters Patent No. 236,269, dated January 4, 1881.

Application filed July 7, 1880. (No model.)

*To all whom it may concern:*

Be it known that I, CYRUS SMITH, of Canton, in the county of Stark and State of Ohio, have invented certain new and useful Improvements in Grain-Separators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a longitudinal section of a winnowing-machine embodying my improvements. Fig. 2 is a rear elevation. Fig. 3 is a partial view of the lower double screen. Fig. 4 is a section of the outer end of the grain-trough and the stationary shield.

The frame of the machine is formed of the uprights A A, the bottom cross-pieces, B B, and the top cross-pieces, C C.

D D' represent the lateral walls of the casing, and $D^2$ the top.

$D^3$ is the drum or casing for the fan E, which is mounted at the front end of the machine. Within the rear part of the casing is supported the shoe or reciprocating part of the mechanism.

F F are the vertical walls of the shoe, loosely supported by links $f\ f$, which are pivoted to the frame. At the forward end of the shoe and in the upper part there is a stationary inclined chute, G, arranged to receive the grain from the hopper.

I is a substantially horizontal screen or riddle, supported upon cleats, and the grain is received upon it as it leaves the chute G. The blast of air from the fan is directed upward through the screen I, whereby the chaff and coarser refuse are blown over the rear end of the sieve. The grain passes through the screen and is carried upon the inclined board or chute K inward toward the fan, and is delivered to a second screen or riddle, L. As the grain passes down the chute K any dirt or fine refuse that may pass through the upper screen, I, is thrown by the blast over the rear end of the chute. The rear end of this inclined chute is adjustable, and the chute serves not only to carry the grain to the lower screen, but also to throw the air upward, so that it shall strike the grain as it comes from the hopper. The cleaned material that reaches the lower screen or riddle, L, is of several kinds, including (besides the perfect kernels) imperfect kernels, grass-seed, cockles, &c., constituting the screenings. The foreign seeds and inferior grains pass through the screen at the inner or front end, the less imperfect pass through the rear or outer end, and the perfect grain passes over the outer end to the trough M. The screenings that pass through the lower screen, L, are received upon an inclined chute, N, which carries them inward and delivers them beneath the machine.

The trough M is attached at the rear end of the shoe, beneath the lower screen, L, and is reciprocated by the shoe, the delivery of the grain being thus very much facilitated. The trough projects beyond the side of the machine and delivers the grain to a bag or other receptacle through a stationary shield, O, attached to the casing. This shield is tight at the sides and top, and formed with an aperture, $o$, in the bottom, which latter is preferably inclined.

The lower screen or riddle, L, is adjustable longitudinally, so that it can be made to project more or less over the inner edge of the trough M. It is formed with a sieve, L', attached to the upper side of the frame, and with a lower sieve, $L^2$, attached to the under side. The lower sieve, $L^2$, is of a mesh somewhat finer than that of the upper sieve, L'. It does not extend the full length of the supporting-frame, but is arranged to leave an opening, $l$, at the outer end. It often happens that material passes through the screens which it is desired should pass to the trough M, and by constructing the screen with the lower sieve, $L^2$, this material can be prevented from passing downwardly except at the opening $l$; and by arranging the screen so that it can be longitudinally adjusted the opening $l$ can be placed over the trough M or over the chute N, and thus the quantity and quality of grain passing in either direction can be regulated.

The side piece, $l'$, of the screen-frame has several apertures, $l^2$, through which the rod P is arranged to pass, whereby the screen can be held in any desired position.

It will be seen that in order to permit the above-described guiding of the better part of the screenings it is necessary to deliver the grain at the rear end of the machine, and when so delivered it is necessary to obviate the mixing of the chaff therewith.

I attach a large sheet-metal apron, Q, to the chute between the points at which the chaff and grain are respectively delivered. This shield or apron carries the chaff entirely over and clear of the grain.

The chute-board K is made longitudinally adjustable, as shown by dotted lines, Fig. 2, so that it can be arranged to catch any desirable material that may be thrown over the outer end of the screen I.

R represents a wall arranged transversely across the lower part of the shoe, immediately below the rear end of the screen L. It prevents the fan from throwing dust or refuse into the trough M or among the good grain. The shield O prevents the grain from scattering over the floor as it leaves the vibrating trough M and delivers it evenly to the bag or other receptacle.

What I claim is—

In a winnower, the combination, with the fan E, of the vibrating shoe, constructed with the upper screen, I, inwardly-inclined chute K, which carries the grain away from said screen and guides the air-blast thereto, the outwardly-inclined screen L, the inwardly-inclined chute N, the grain-trough M, attached to the rear end of the shoe, and the shield or apron Q between the grain-trough and the chute K, substantially as and for the purposes set forth.

In testimony that I claim the foregoing I have hereunto set my hand this 28th day of June, 1880.

CYRUS SMITH.

Witnesses:
HENRY FISHER,
J. P. FAWCETT.